United States Patent [19]
Matsubara et al.

[11] Patent Number: 5,767,171
[45] Date of Patent: Jun. 16, 1998

[54] COATING COMPOSITION

[75] Inventors: Yoshiro Matsubara; Masayasu Itoh; Masahiro Ishidoya; Yoshihiro Honda, all of Hyogo, Japan

[73] Assignee: NOF Corporation, Tokyo, Japan

[21] Appl. No.: 560,028

[22] Filed: Nov. 17, 1995

[30] Foreign Application Priority Data

Nov. 21, 1994 [JP] Japan ................. 6-312675

[51] Int. Cl.$^6$ .................. C09D 5/14; C08L 33/14
[52] U.S. Cl. .............. 523/122; 523/177; 524/547; 524/558; 524/588; 526/279; 528/32
[58] Field of Search ................. 523/122, 177; 524/588, 558, 547; 526/279

[56] References Cited

U.S. PATENT DOCUMENTS 3,896,753  7/1975  Sheperd et al. ............. 114/67 R
5,436,284  7/1995  Honda et al. ............. 523/122

FOREIGN PATENT DOCUMENTS 0297505    1/1989  European Pat. Off.
04103671   4/1992  Japan.
04264168   9/1992  Japan.
WO8402915  8/1984  WIPO.

*Primary Examiner*—Andrew E. C. Merriam
*Attorney, Agent, or Firm*—Sughrue, Mion, Zinn, Macpeak & Seas, PLLC

[57] ABSTRACT

A hydrolyzable self-polishing coating composition for use in preventing attachment of organisms to the surface of structures submerged in seawater, which comprises an anifoulant and a copolymer of an organosilyl group-containing monomer and a hemiacetal ester group-containing monomer.

6 Claims, No Drawings

COATING COMPOSITION

FIELD OF THE INVENTION

The present invention relates to a coating composition for use in preventing the attachment of organisms to the surfaces of structures submerged in seawater.

BACKGROUND OF THE INVENTION

The surfaces of structures submerged in seawater such as ship bottoms, buoys, fishing nets (e.g., forming nets, fixed nets), antifouling films in water and draft or drain pipes for cooling undergo various troubles by the attachment of barnacles, tube worms, mussels, algal, seaweeds or the like. It is well known to use paints capable of preventing the attachment of marine organisms to the submerged surfaces in order to prevent the fouling on marine structures due to marine organisms. Heretofore, as antifouling paints for preventing the attachment of marine organisms, paints have been used which are of the type that the basic resin forming a film does not dissolve into seawater in initial stages and, with the dissolution of rosin which is one component of the film-forming resin, an antifoulant is extracted from the film and dissolves into seawater to prevent the attachment of marine organisms.

The antifouling paints of the above type generally have an excellent initial antifouling effect due to the retention of the basic structure of the film-forming resin but had disadvantage that the antifouling effect decreased over a long period of time.

As improved antifouling paints, a so-called hydrolyzable self-polishing paints has been used in which a film-forming basic resin per se is hydrolyzed in seawater. The paints of this type have advantage that the surface of the antifouling film is kept erosive and prolonged antifouling period can be obtained due to erosion mechanism.

Heretofore, organotin polymers have widely been used as such hydrolyzable self-polishing paints. In recent years, however, the sea pollution due to organotin compounds which are released as antifoulants upon the hydrolyzation of the organotin-containing polymers has become a serious problem. For this reason, organotin-free hydrolyzable antifouling paints have keenly been demanded.

JP-W-60-500452 discloses various examples of hydrolyzable groups contained in the hydrolyzable self-polishing paints. (The term "JP-W" as used herein means an unexamined published PCT application). JP-W-60-500452 also discloses polymers utilizing the hydrolyzability of (meth) acrylic acid esters of an organosilicon (having an alkoxysilyl group or an organosilyl group). Also, JP-A-4-103671 discloses antifouling coating compositions using vinyl polymers having a hemiacetal ester group or a hemiketal ester group as hydrolyzable group. (The term "JP-A" as used herein means an unexamined published Japanese patent application.)

JP-W-500452 describes preparation of tris(4-methyl-2-pentoxy)silyl acrylate in Examples but fails to describe either polymer compositions using this monomer or their test results showing an effect of antifouling paints. Also, concerning organosilyl groups, JP-W-60-500452 discloses $SiR_3$ in the claims but describes nothing about the organosilyl groups in the Examples. There is no description in JP-W-60-500452 as to which compositions are suitable as antifouling paints.

The present inventors have investigates acrylic acid ester resins, methacrylic acid ester resins, maleic acid ester resins and fumaric acid ester resins all of which have an organosilyl group in side chains. As a result, it has been found that the resins modified by incorporating only an organosilyl group in side chains have the problems as follows: (1) the coating films formed therefrom do not show erosion in the rotary test which is the most important test for evaluating hydrolyzable antifouling paints (a test for measuring the coating film thickness reduction as erosion rate in which the test pieces are fixed to the outer circumferential surface of a cylindrical drum and the drum is rotated in seawater at peripheral speed of 16 knots); (2) the coating films do not exhibit satisfactory antifouling properties in exposure test (immersion test); and (3) the coating films develop crackings and show poor adhesion property to the substrates, or primer coats so that they are peeled off when immersed in seawater. Thus, the above-described resins are not suitable as antifouling paints.

Also, concerning antifouling coating compositions described in JP-A-4-103671, the present inventors have investigated acrylic acid ester resins, methacrylic acid ester resins, maleic acid ester resins, and fumaric acid ester resins all of which have a hemiacetal ester group or a hemiketal ester group in side chains. As a result, it has been found that most of the vinyl polymers in which the above-described group is introduced in an amount necessary and sufficient for imparting to the polymers the solubility in water required for anti fouling paints, have high hydrophilicity, and the coating films formed therefrom blister and wrinkle in seawater. Thus, the above vinyl polymers do not exhibit sufficient antifouling effect.

SUMMARY OF THE INVENTION

Accordingly, an object of the present invention is to provide, as a hydrolyzable self-polishing coating composition, a coating composition forming a coating film which undergoes neither cracking or peeling and shows moderate hydrolyzability to dissolve into seawater constantly at an adequate rate and which therefore exhibits excellent antifouling properties for long term.

As a result of intensive studies made by the present inventors to attain the above object, the present invention has been completed based on the finding that copolymers of organosilyl group-containing monomers with hemiacetal ester group-containing monomers satisfy all the requirements for the hydrolyzable antifouling paints such that the coating films formed therefrom exhibit a constant film thickness reduction rate as erosion rate in the rotary test and excellent antifouling properties for long term and show good adhesion to the substrate or primer coat.

The present invention is concerned with a coating composition containing as essential components an antifoulant and a copolymer obtained from a monomer mixture comprising monomer A represented by formula (1):

wherein $R^1$ to $R^3$ which may be the same or different, each represents a linear, branched or cyclic alkyl group or an aryl group and X represents an acryloyloxy group, a methacryloyloxy group, a maleinoyloxy group, or a fumaroyloxy group and monomer B represented by formula (2):

$$Y-\underset{\underset{OR^5}{|}}{\overset{\overset{R^4}{|}}{CH}} \quad (2)$$

wherein $R^4$ represents a linear or branched alkyl group, $R_5$ represents a linear, branched or cyclic alkyl group, and Y represents an acryloyloxy group, a methacryloyloxy group, a maleinoyloxy group, or a fumaroyloxy group, and optionally another vinyl monomer C capable of copolymerizing with monomers A and B.

DETAILED DESCRIPTION OF THE INVENTION

The coating composition of the present invention contains as one of its essential components a copolymer obtained from monomer mixture which comprises at least one of monomer A represented by formula (1) and at least one of monomer B represented by formula (2), and optionally another vinyl monomer C copolymerizable therewith.

As shown in formula (1), monomer A has in its molecule an acryloyloxy group, a methacryloyloxy group, a maleinoyloxy group (mostly in the form of monoalkyl ester with 1 to 6 carbon atoms), or a fumaroyloxy group (mostly in the form of monoalkyl ester with 1 to 6 carbon atoms) as an unsaturated group (X) and also has a triorganosilyl group.

In the triorganosilyl group, the three alkyl and/or aryl groups ($R^1$ to $R^3$) may be the same or different. Specific examples of these groups include a linear alkyl group having up to 20 carbon atoms (e.g., methyl, ethyl, n-propyl, and n-butyl); a branched alkyl group having up to 20 carbon atoms (e.g., isopropyl, isobutyl, sec-butyl, and t-butyl); a cycloalkyl group (e.g., cyclohexyl); and an aryl group (e.g., phenyl, tolyl, xylyl, biphenyl, and naphthyl) which may be substituted with a halogen atom, an alkyl group with up to about 18 carbon atoms, an acyl group, a nitro group, or an amino group.

Examples of monomer A which has an acryloyloxy or methacryloyloxy group (herein collectively referred to as a "(meth)acryloyloxy group") in a molecule include trimethylsilyl (meth)acrylate (TMS(M)A), triethylsilyl (meth) acrylate (TES(M)A), tri-n-propylsilyl (meth)acrylate (TPS (M)A), tri-n-butylsilyl (meth)acrylate(TBS(M)A), tri-n-amylsilyl (meth)acrylate, tri-n-hexylsilyl (meth)acrylate, tri-n-octylsilyl (meth)acrylate, tri-n-dodecylsilyl (meth) acrylate, triphenylsilyl (meth)acrylate, tri-p-methylphenylsilyl (meth)-acrylate, tribenzylsilyl (meth) acrylate, triisopropylsilyl (meth)acrylate, triisobutylsilyl (meth)acrylate, tri-sec-butylsilyl (meth)acrylate, tri-2-methylisopropylsilyl (meth)-acrylate, and tri-t-butylsilyl (meth)acrylate.

Other examples of monomer A having a (meth) acryloyloxy group in a molecule include ethyldimethylsilyl (meth)acrylate, n-butyldimethylsilyl (meth)acrylate, diisopropyl-n-butylsilyl (meth)acrylate, n-octyldi-n-butylsilyl (meth)acrylate, diisopropylstearylsilyl (meth) acrylate, dicyclohexylphenylsilyl (meth)acrylate, t-butyldiphenylsilyl (meth)acrylate, and lauryldiphenylsilyl (meth)acrylate.

Examples of monomer A which has a maleinoyloxy or fumaroyloxy group in a molecule include triisopropylsilyl methyl maleate, triisopropylsilyl amyl maleate, tri-n-butylsilyl n-butyl maleate, t-butyldiphenylsilyl methyl maleate, t-butyldiphenylsilyl n-butyl maleate, triisopropylsilyl methyl fumarate, triisopropylsilyl amyl fumarate, tri-n-butylsilyl n-butyl fumarate, t-butyldiphenylsilyl methyl fumarate, and t-butyldiphenylsilyl n-butyl fumarate.

As shown in formula (2), monomer B has in its molecule an acryloyloxy group, a methacryloyloxy group, a maleinoyloxy group (mostly in the form of monoalkyl ester with 1 to 6 carbon atoms), or a fumaroyloxy group (mostly in the form of monoalkyl ester with 1 to 6 carbon atoms) group as an unsaturated group (Y).

Examples of the alkyl group for $R^4$ include a linear or branched alkyl group having up to 12 carbon atoms, prefereably from 1 to 4 carbon atoms (e.g., methyl, ethyl, n-propyl, n-butyl, isopropyl, isobutyl, and t-butyl); and examples of the alkyl group for $R^5$ include a linear or branched alkyl group having up to 12 carbon atoms, preferably from 1 to 8 carbon atoms (e.g., methyl, ethyl, n-propyl, isopropyl, n-butyl, isobutyl, and t-butyl), and a substituted or unsubstituted cycloalkyl group, prefereably from 5 to 8 carbon atoms (e.g., cyclohexyl).

Monomer B can be prepared by an ordinary addition reaction of a carboxy group-containing vinyl monomer selected from acrylic acid, methacrylic acid, maleic acid (or monoester thereof), and fumaric acid (or monoester thereof), with an alkyl vinyl ether (e.g., ethyl vinyl ether, propyl vinyl ether, butyl vinyl ether, hexyl vinyl ether, and 2-ethylhexyl vinyl ether), or a cycloalkyl vinyl ether (e.g., cyclohexy vinyl ether).

Examples of monomer C which is an optional monomer component copolymerizable with monomers A and B, include vinyl monomers such as acrylic esters, methacrylic esters, styrene, vinyl esters (e.g., vinyl acetate, vinyl propionate, vinyl butyrate, vinyl benzoate), vinyltoluene, α-methylstyrene, crotonic esters, and itaconic esters.

In the monomers mixture, the proportions of monomers A and B and monomer C may be suitably determined depending on the use of the coating composition. In general, however, it is preferred that the proportion of monomer A is from 1 to 95% by weight and more preferably from 1 to 80% by weight, that of monomer B is from 1 to 95% by weight, and more preferably from 1 to 80% by weight, and that of monomer C is up to 98% by weight, on the basis of the total weight of the monomers.

The copolymer which is an essential component of the coating composition can be obtained by polymerizing such monomer mixture in the presence of vinyl polymerization initiators by any of various known methods such as solution polymerization, bulk polymerization, emulsion polymerization, and suspension polymerization in an ordinary way. In preparing a coating composition using the resulting copolymer, it is advantageous to dilute the copolymer with an organic solvent to give a polymer solution having an adequate viscosity. For this, it is desirable to employ the solution polymerization method or bulk polymerization method.

Examples of the vinyl polymerization initiator include azo compounds such as azobisisobutyronitrile and triphenylmethylazobenzene; and peroxides such as benzoyl peroxide, di-t-butyl peroxide, t-butyl peroxybenzoate, and t-butyl peroxyisopropylcarbonate.

Examples of the organic solvent include aromatic hydrocarbons such as xylene and toluene; aliphatic hydrocarbons such as hexane and heptane; esters such as ethyl acetate and butyl acetate; alcohols such as isopropyl alcohol and butyl alcohol; ethers such as dioxane and diethyl ether; and ketones such as methyl ethyl ketone and methyl isobutyl ketone. The solvent may be used alone or in combination thereof.

The molecular weight of copolymer thus obtained is desirably in the range of from 1,000 to 150,000, preferably from 3,000 to 100,000, in terms of weight-average molecular weight. Too low molecular weights result in difficulties in forming normal coating film, while too high molecular weights result in disadvantages that a single coating operation only gives thin coating film and, hence, coating operations should be conducted many times. It is advantageous that viscosity of a solution of the copolymer is 150 poise or lower at 25° C.

The antifoulant used as the other essential component in the coating composition of the present invention may be any of conventionally known antifoulants. The known antifoulants are roughly divided into inorganic compounds, metal-containing organic compounds, and metal-free organic compounds.

Examples of the inorganic compounds include copper compounds (e.g., cuprous oxide, copper powder, copper thiocyanate, copper carbonate, copper chloride, and copper sulfate), zinc sulfate, zinc oxide, nickel sulfate, and copper-nickel alloys.

Examples of the metal-containing organic compounds include organocopper compounds, organonickel compounds, and organozinc compounds. Also usable are maneb, manzeb, propineb, and the like. Examples of the organocopper compounds include oxine copper, copper nonylphenolsulfonate, copper bis(ethylene-diamine) bis (dodecylbenzenesulfonate), copper acetate, copper naphthenate, and copper bis(pentachlorophenolate). Examples of the organonickel compounds include nickel acetate and nickel dimethyldithiocarbamate. Examples of the organozinc compounds include zinc acetate, zinc carbamate, zinc dimethyldithio-carbamate, zinc pyrithione, and zinc ethylenebis(dithio-carbamate).

Examples of the metal-free organic compounds include N-trihalomethylthiophthalimides, dithiocarbamic acids, N-arylmaleimides, 3-(substituted amino)-1,3-thiazolidine-2, 4-diones, dithiocyano compounds, triazine compounds, and others.

Examples of the N-trihalomethylthiophthalimides include N-trichloromethylthiophthalimide and N-fluorodichloromethylthiophthalimide. Examples of the dithiocarbamic acids include bis(dimethylthiocarbamoyl) disulfide, ammonium N-methyldithio-carbamate, ammonium ethylenebis(dithiocarbamate), and milneb.

Examples of the N-arylmaleimides include N-(2,4,6-trichlorophenyl)maleimide, N-4-tolylmaleimide, N-3-chlorophenylmaleimide, N-(4-n-butylphenyl)maleimide, N-(anilinophenyl)maleimide, and N-(2,3-xylyl)maleimide.

Examples of the 3-(substituted amino)-1,3-thiazolidine-2,4-diones include 3-benzylideneamino-1,3-thiazolidine-2, 4-dione, 3-(4-methylbenzylideneamino)-1,3-thiazolidine-2, 4-dione, 3-(2-hydroxybenzylideneamino)-1,3-thiazolidine-2,4-dione, 3-(4-dimethylaminobenzylideneamino)-1,3-thiazolidine-2,4-dione, and 3-(2,4-dichlorobenzylideneamino)-1,3-thiazolidine-2,4-dione.

Examples of the dithiocyano compounds include dithiocyanomethane, dithiocyanoethane, and 2,5-dithiocyanothiophene. Examples of the triazine compounds include 2-methylthio-4-t-butylamino-6-cyclopropylamino-s-triazine.

Other examples of the metal-free organic compounds include 2,4,5,6-tetrachloroisophthalonitrile, N,N-dimethyldichlorophenylurea, 4,5-dichloro-2-n-octyl-4-isothiazoline-3-one, N,N-dimethyl-N'-phenyl-(N-fluorodichloromethylthio)-sulfamide, tetramethylthiuramdisulfide, 3-iodo-2-propinylbutyl carbamate, 2-(methoxycarbonylamino)benzimidazole, 2,3,5,6-tetrachloro-4-(methylsulfonyl)pyridine, diiodomethyl-p-tolyl sulfone, bis(dimethylcarbamoyl)zinc ethylene bis (dithiocarbamate), phenyl(bispyridine)bismuth dichloride, 2-(4-thiazolyl)benzimidazole, and pyridine triphenylborane.

One or more antifoulants selected from such antifoulants are employed in the present invention. The antifoulants are used in such an amount that the proportion thereof in the solid contents of the coating composition is usually from 0.1 to 90% by weight, preferably 0.1 to 80% by weight, and more preferably from 1 to 60% by weight. Too small antifoulant amounts do not produce an antifouling effect, while too large antifoulant amounts result in the formation of a coating film which is apt to develop defects such as cracking and peeling and thus becomes less effective in antifouling property.

Additive ingredients may optionally be incorporated into the coating composition of the present invention thus prepared. Exemples of the additive ingredients are colorants such as pigments (e.g., red iron oxide, zinc oxide, titanium dioxide, talc), and dyes, dehumidifiers, and additives ordinarily employed in coating compositions as antisagging agents, antiflooding agents, antisettling agents, and antifoaming agents.

For formulating antifouling coating film from the coating composition of the present invention on the surface of a structure to be submerged in seawater, use may be made of a method in which the coating composition is applied on the surface in a suitable manner and the solvent is removed by evaporation at ordinary temperature or with heating. By this method, a dry coating film can be easily formed on the surface of the structure.

The coating composition of the present invention is applicable to objects required to be protected against the fouling or damage caused by marine organisms, such as ship bottoms, fishing nets, and underwater structures including cooling water pipes, and is also usable for the prevention of sludge diffusion in marine construction works. In such applications, the coating film undergoes neither cracking nor peeling, shows moderate hydrolyzability to dissolve into the seawater constantly at adequate rate, and is hence capable of affording long-lasting excellent protection against the fouling or damage caused by marine organism attachment.

The present invention will be explained below in more detail by reference to Reference Examples (synthesis of monomer B, i.e., hemi-acetal group-containing monomer), Preparation Examples, Examples (of the present invention), and Comparative Examples. In these examples, unless otherwise indicated, all parts are by weight and the molecular weights are given in terms of weight-average molecular weight measured by GPC and calculated for standard polystyrene. Further, the viscosity is a value measured at 25° C. by a bubble viscometer.

REFERENCE EXAMPLES 1 TO 3

According to the formulations shown in Table 1 below, EVE (ethyl vinyl ether), PrVE (propyl vinyl ether) or CHVE (cyclohexyl vinyl ether) as Material 1 was placed in a flask equipped with a stirrer, followed by heating to 60° C. while stirring and introducing nitrogen gas. To the flask, AA (acrylic acid) as Material 2 was added dropwise over a period of one hour. After completion of the dropwise addition of Material 2, the temperature of the mixture was maintained as it was for 24 hours to complete the reaction. Thus, three kinds of hemiacetal ester group-coating monomers (monomer B) indicated by the symbols in Table 1 were synthesized.

TABLE 1

| | | Reference Examples | | |
|---|---|---|---|---|
| | | 1 | 2 | 3 |
| Formulation (parts) | | | | |
| Material 1 | EVE | 50 | — | — |
| | PrVE | — | 54.43 | — |
| | CHVE | — | — | 63.64 |
| Material 2 | AA | 50 | 45.57 | 36.36 |
| Monomer B | | EVEbAA*1 | PrVEbAA*2 | CHVEbAA*3 |

Note:
*1 1-ethoxyethyl acrylate
("EVEbAA" is the abreviation of Ethyl Vinyl Ethyl blocked Acrylic Acid.)
*2 1-propoxyethyl acrylate
*3 1-cyclohexyloxyethyl acrylate

REFERENCE EXAMPLES 4 TO 6

Three kinds of hemiacetal ester group-containing monomers (monomer B), indicated by the symbols in Table 2 below were synthesized in the same manner as in Reference Examples 1 to 3 except that PrVE (propyl vinyl ether) was used as Material 1 and MAA (methacrylic acid), MM1A (methyl maleate) or MFmA (methyl fumarate) were used as Material 2 according to the formulations shown in Table 2.

TABLE 2

| | | Reference Examples | | |
|---|---|---|---|---|
| | | 4 | 5 | 6 |
| Formulation (parts) | | | | |
| Material 1 | PrVE | 50 | 39.45 | 39.81 |
| Material 2 | MAA | 50 | — | — |
| | MM1A | — | 60.55 | — |
| | MFmA | — | — | 60.19 |
| Monomer B | | PrVEbMAA*1 | PrVEbMM1A*2 | PrVEbMFmA*3 |

Note:
*1 1-propoxyethyl methacrylate
*2 1-propoxyethyl methyl maleate
*3 1-propoxyethyl methyl fumarate

PREPARATION EXAMPLES 1 TO 10

According to the formulations shown in Table 3 given below, xylene (solvent) was placed in a flask equipped with a stirrer and heated to 80° C. while nitrogen gas was intoduced thereto. Then, a liquid mixture of monomers A, B, and C and 2,2'-azobisisobutyronitrile (polymerization catalyst) was introduced dropwise into the flask with stirring over a period of 3 hours. After completion of the addition, the contents were held at that temperature for 5 hours to complete the polymerization. Thereafter, xylene (diluent solvent) was added to the reaction solution, whereby ten kinds of solutions of polymer having a silyl ester group and a hemi-acetal ester group in its molecule were prepared (polymer solutions I to X).

COMPARATIVE PREPARATION EXAMPLES 1 TO 2

Polymer solutions XI and XII were prepared in the same manner as in the preparation of polymer solutions I to X, except that neither monomer A nor monomer B was added as shown in Table 3.

TABLE 3

| | | Preparation Example No. | | | | | | | | | | | |
|---|---|---|---|---|---|---|---|---|---|---|---|---|---|
| | | 1 | 2 | 3 | 4 | 5 | 6 | 7 | 8 | 9 | 10 | C1*1 | C2*1 |
| Composition | | | | | | | | | | | | | | |
| Solvent | | 70 | 70 | 70 | 70 | 70 | 70 | 70 | 70 | 70 | 70 | 70 | 70 |
| Monomer A*2 | TBSA | 40.572 | 40.572 | 40.572 | 40.572 | — | — | — | — | — | — | 67.620 | — |
| | TMSA | — | — | — | — | 7.212 | — | — | — | — | — | — | — |
| | TESA | — | — | — | — | — | 18.632 | — | — | — | — | — | — |
| | TPSA | — | — | — | — | — | — | 66.091 | — | — | — | — | — |
| | TESMA | — | — | — | — | — | — | — | 40.070 | — | — | — | — |
| | TBSMMA | — | — | — | — | — | — | — | — | 49.275 | — | — | — |
| | TBSMFA | — | — | — | — | — | — | — | — | — | 49.275 | — | — |
| Monomer B: | EVEbAA | 14.417 | — | — | — | — | — | — | — | — | — | — | — |
| | PrVEbAA | — | 15.820 | — | — | — | — | — | — | — | — | — | 39.550 |
| | CHVEbAA | — | — | 19.826 | — | — | — | — | — | — | — | — | — |
| | PrVEbMAA | — | — | — | 21.623 | 42.458 | 31.843 | 10.615 | 7.209 | — | — | — | — |
| | PrVEbMMIA | — | — | — | — | — | — | — | — | 21.623 | — | — | — |
| | PrVEbMFmA | — | — | — | — | — | — | — | — | — | 21.623 | — | — |
| Monomer C: | MMA | 45.011 | 43.608 | 39.602 | 37.805 | 50.330 | 49.525 | 23.294 | 52.721 | — | — | 32.380 | 60.450 |
| | VAc | — | — | — | — | — | — | — | — | 29.102 | 29.102 | — | — |
| Polymerization initiator | | 0.5 | 0.5 | 0.5 | 0.5 | 0.5 | 0.5 | 0.5 | 0.5 | 0.5 | 0.5 | 0.5 | 0.5 |
| Diluent solvent | | 29.5 | 29.5 | 29.5 | 29.5 | 29.5 | 29.5 | 29.5 | 29.5 | 29.5 | 29.5 | 29.5 | 29.5 |

TABLE 3-continued

| | Preparation Example No. | | | | | | | | | | | |
|---|---|---|---|---|---|---|---|---|---|---|---|---|
| | 1 | 2 | 3 | 4 | 5 | 6 | 7 | 8 | 9 | 10 | C1[*1] | C2[*1] |
| Properties | | | | | | | | | | | | |
| Viscosity | G–H | I | J–K | F–G | C–D | B–C | K–L | F–G | K | L–M | K | M–N |
| Weight average Mw | 38,000 | 43,000 | 38,000 | 40,000 | 41,000 | 44,000 | 39,000 | 42,000 | 28,000 | 35,000 | 41,000 | 38,000 |
| Polymer solution No. | I | II | III | IV | V | VI | VII | VIII | IX | X | XI | XII |

Note:
[*1] C1: Comparative Preparation Example 1
C2: Comparative Preparation Example 2
[*2] TBSA: Tributylsilyl acrylate
TMSA: Trimethylsilyl acrylate
TESA: Triethylsilyl acrylate
TPSA: Triisopropylsilyl acrylate
TESMA: Triethylsilyl methacrylate
TBSMMA: Tributylsilyl methylmaleate
TBSMFA: Tributylsilyl methylfumarate
MMA: Methyl methacrylate
VAc: Vinyl Acetate

EXAMPLES 1 TO 10

32.8 parts of each of polymer solutions I to X was mixed with 57.41 parts of cuprous oxide (antifoulant), 1.19 parts of titanium dioxide (pigment), 3 parts of "Disparon A630-20X" (trade name of Kusumoto Chemicals Ltd., Japan; antisagging agent) and 5.6 parts of xylene (solvent) using a paint shaker, to thereby prepared 10 kinds of coating compositions, respectively (Examples 1 to 10).

EXAMPLES 11 TO 31

Various coating compositions were prepared by mixing the components shown in Table 4 in the same manner as in Example 1.

TABLE 4

| | Example No. | | | | |
|---|---|---|---|---|---|
| Composition | 11 | 12 | 13 | 14 | 15 |
| Polymer solution (kind/parts) | I/32.8 | II/32.8 | III/32.8 | IV/32.8 | V/32.8 |
| Antifoulant (kind/parts) | Copper thiocyanate/30 | Cuprous oxide/30 Maneb/10 | Cuprous oxide/30 Zinc dimethyl dithiocarbamate /10 | Cuprous oxide/30 2-Methylthio-4-t-butylamino-6-cyclopropylamino-s-triazine/5 | Cuprous oxide/30 2,4,5,6-Tetrachloro-isophthalo-nitrile/5 |
| Pigment (kind/parts) | Titanium dioxide/1.19 | Titanium dioxide/1.19 | Titanium dioxide/1.19 | Titanium dioxide/1.19 | Titanium dioxide/1.19 |
| Disparon A630-20X (parts) | 3 | 3 | 3 | 3 | 3 |
| Xylene (parts) | 33.01 | 23.01 | 23.01 | 28.01 | 28.01 |

| Example No. | | | | | |
|---|---|---|---|---|---|
| Composition | 16 | 17 | 18 | 19 | 20 |
| Polymer solution (kind/parts) | VI/32.8 | VII/32.8 | VIII/32.8 | IX/32.8 | X/32.8 |
| Antifoulant (kind/parts) | N,N-dimethyl-dichlorophenyl-urea/20 | Cuprous oxide/30 Zinc ethylene-bis(dithiocarba-mate)/10 | Cuprous oxide/30 4,5-Dichloro-2-n-octyl-3(2H)-isothiazolone/5 | Cuprous oxide/30 N-(fluorodichloro-methyl)phthalimide /5 | Cuprous oxide/30 N,N'-dimethyl-N'-phenyl-(N-fluoro-dichloromethyl-thio)sulfamide/5 |
| Pigment (kind/parts) | Titanium dioxide/1.19 Zinc oxide/5 Talc/5 | Titanium dioxide/1.19 | Titanium dioxide/1.19 | Titanium dioxide/1.19 | Titanium dioxide/1.19 |
| Disparon A630-20X (parts) | 3 | 3 | 3 | 3 | 3 |
| Xylene (parts) | 33.01 | 23.01 | 28.01 | 28.01 | 28.01 |

TABLE 4-continued

| Example No. Composition | 21 | 22 | 23 | 24 | 25 |
|---|---|---|---|---|---|
| Polymer solution (kind/parts) | I/32.8 | II/32.8 | III/32.8 | IV/32.8 | V/32.8 |
| Antifoulant (kind/parts) | Cuprous oxide/30 Zinc pyrithione /10 | Cuprous oxide/30 Tetramethylthiuram disulfide/5 | Cu-Ni alloy (10% Ni)/40 | Cuprous oxide/30 N-(2,4,6-trichloro-phenyl)maleimide/5 | Cuprous oxide/30 2,3,5,6-Tetrachloro-4-(methylsulfonyl)-pyridine/5 |
| Pigment (kind/parts) | Titanium dioxide/1.19 | Titanium dioxide/1.19 | Titanium dioxide/1.19 | Titanium dioxide/1.19 | Titanium dioxide/1.19 |
| Disparon A630-20X (parts) | 3 | 3 | 3 | 3 | 3 |
| Xylene (parts) | 23.01 | 28.01 | 23.01 | 28.01 | 28.01 |

| Example No. Composition | 26 | 27 | 28 | 29 | 30 | 31 |
|---|---|---|---|---|---|---|
| Polymer solution (kind/parts) | VI/32.8 | VII/32.8 | VIII/32.8 | IX/32.8 | X/32.8 | I/32.8 |
| Antifoulant (kind/parts) | Cuprous oxide/30 3-Iodo-2-propinyl butyl carbamate/5 | Cuprous oxide/30 Diiodomethyl-p-tolyl sulfone/5 | Cuprous oxide/30 Bis(dimethyl-carbamoyl) zinc ethylene bis(dithio-carbamate)/5 | Cuprous oxide/30 Phenyl-(bispyridine)-bismuth dichloride/5 | Cuprous oxide/30 2-(4-Thiazolyl)-benzimida-zole/5 | Cuprous oxide/30 Pyridine triphenyl-borane/5 |
| Pigment (kind/parts) | Titanium dioxide/1.19 | Titanium dioxide/1.19 | Titanium dioxide/1.19 | Titanium dioxide/1.19 | Titanium dioxide/1.19 | Titanium dioxide/1.19 |
| Disparon A630-20X (parts) | 3 | 3 | 3 | 3 | 3 | 3 |
| Xylene (parts) | 28.01 | 28.01 | 28.01 | 28.01 | 28.01 | 28.01 |

COMPARATIVE EXAMPLES 1 TO 2

Two coating compositions were prepared in the same manner as in Example 1, except that polymer solution I was replaced with each of polymer solutions XI and XII, respectively (Comparative Examples 1 and 2).

Each of the coating compositions prepared in Examples 1 to 31 and Comparative Examples 1 to 2 given above was subjected to a film wear test, antifouling performance test, adhesion test, and cracking resistance test according to the methods described below. The results obtained are shown in Tables 5 to 8 below.

Erosion Test

Steel panels (100 mm×100 mm×1 mm) whose back-side surfaces had been coated with an anticorrosive paint were then coated, on the front side, with each coating composition by spraying to provide a thickness of 200 μm on a dry basis. The coating composition applied was dried indoors at 20° C. for 1 week to prepare test pieces.

Each test piece was fixed to the outer circumferential surface of a cylindrical drum having a diameter of 50 cm. The resulting drum was immersed in the seawater of Yura Bay, Sumoto, Hyogo, Japan at a depth of 1 m from the sea level and rotated with a motor at such a rate that the peripheral speed of the drum was 16 knots. The reduction in coating film thickness as erosion rate was measured at an interval of 3 months over a period of 18 months. The average erosion rate (μm/month) was calculated. An average erosion rate of 3 μm/month or higher correlates with sufficient antifouling performance and self-polishing property.

Exposure Test (Antifouling Performance Test) Sand-blasted steel panels (100 mm×200 mm×1 mm) were coated with a tar-vinyl anticorrosive paint, and were then coated on both sides with each coating composition by spraying twice to provide a thickness of 240 μm on a dry basis for each side. The coated panels were dried for 1 week in a thermo-hygrostatic chamber at 20° C. and a humidity of 75% to prepare test pieces.

The test pieces were immersed in the seawater of Aioi Bay, Aioi, Hyogo for 24 months to examine the change with time of the proportion of that area of the coating film which was covered with marine organisms attached thereto.

Adhesion Test

Blasted steel panels were coated twice with a tar-epoxy anticorrosive paint by spraying to provide a thickness of 125 μm on a dry basis for each application, and then further coated with a tar-vinyl sealer coat to provide a thickness of 70 μm on a dry basis. The resulting steel panels were coated with each coating composition by spraying twice to provide a thickness of 100 μm on a dry basis and then dried for 1 week in a thermo-hygrostatic chamber at 20° C. and a humidity of 75% to prepare test pieces.

The test pieces were immersed in artificial seawater. After immersion for each of 3, 6, 9, 12, and 18 months, the test pieces were pulled out of the water and subjected to a crosscut tape test (JIS K5400-1990) in which the coating film was incised at an interval of 2 mm. Adhesion was evaluated as follows: the test pieces in which the number of unpeeled squares was 25 per 25 are indicated by ○ (acceptable), and those in which that number was 24 or smaller per 25 are indicated by × (unacceptable).

Cracking Resistance Test

When the test pieces were pulled out of the artificial seawater in the adhesion test, each coating film was visually examined for cracks. Test pieces having no cracks are indicated by ○ (acceptable), while ones having cracks are indicated by × (unacceptable).

TABLE 5

Erosion test

| | Film thickness reduction (μm) | | | | | Average erosion rate (μm/month) |
|---|---|---|---|---|---|---|
| | 3 months | 6 months | 9 months | 12 months | 18 months | |
| Example 1 | 19.8 | 46.3 | 59.8 | 99.8 | 136.5 | 7.6 |
| Example 2 | 17.3 | 40.7 | 53.5 | 72.6 | 100.5 | 5.8 |
| Example 3 | 19.0 | 40.1 | 66.5 | 72.8 | 131.6 | 7.0 |
| Example 4 | 25.7 | 55.2 | 80.3 | 114.8 | 171.0 | 9.4 |
| Example 5 | 34.2 | 64.9 | 98.3 | 117.8 | 183.3 | 10.3 |
| Example 6 | 13.0 | 27.7 | 39.3 | 55.4 | 98.8 | 5.1 |
| Example 7 | 23.9 | 46.3 | 74.5 | 99.1 | 159.1 | 8.5 |
| Example 8 | 16.2 | 36.8 | 53.3 | 66.6 | 107.6 | 5.9 |
| Example 9 | 16.2 | 36.4 | 60.7 | 72.0 | 117.4 | 6.4 |
| Example 10 | 17.1 | 33.9 | 57.4 | 71.1 | 109.9 | 6.1 |
| Example 11 | 21.6 | 42.4 | 65.1 | 84.6 | 137.8 | 7.7 |
| Example 12 | 19.6 | 38.6 | 59.4 | 73.7 | 118.7 | 6.5 |
| Example 13 | 22.0 | 44.6 | 65.8 | 92.3 | 132.5 | 7.4 |
| Example 14 | 28.5 | 58.0 | 85.0 | 114.7 | 175.1 | 9.7 |
| Example 15 | 32.8 | 65.9 | 97.6 | 121.4 | 188.7 | 10.2 |
| Example 16 | 15.3 | 32.4 | 45.8 | 65.4 | 91.8 | 5.1 |
| Example 17 | 28.3 | 56.5 | 83.2 | 115.8 | 173.8 | 9.7 |
| Example 18 | 18.3 | 39.6 | 55.4 | 78.8 | 110.6 | 6.2 |
| Example 19 | 18.3 | 36.7 | 54.3 | 72.7 | 118.0 | 6.6 |
| Example 20 | 18.4 | 38.8 | 55.9 | 73.7 | 115.4 | 6.4 |
| Example 21 | 24.2 | 49.2 | 73.4 | 96.1 | 155.6 | 8.7 |
| Example 22 | 18.4 | 39.2 | 56.8 | 73.6 | 112.0 | 6.2 |
| Example 23 | 22.9 | 43.6 | 67.0 | 88.8 | 129.0 | 7.1 |
| Example 24 | 32.0 | 63.0 | 93.8 | 129.0 | 193.1 | 10.8 |
| Example 25 | 34.1 | 71.6 | 103.7 | 139.7 | 201.9 | 11.2 |
| Example 26 | 18.9 | 36.6 | 56.0 | 75.7 | 108.7 | 6.0 |
| Example 27 | 29.5 | 54.2 | 86.2 | 117.4 | 166.4 | 9.3 |
| Example 28 | 18.4 | 39.2 | 54.6 | 77.3 | 110.6 | 6.1 |
| Example 29 | 21.7 | 43.2 | 67.1 | 85.3 | 130.3 | 7.2 |
| Example 30 | 21.6 | 44.7 | 68.6 | 90.7 | 126.1 | 7.0 |
| Example 31 | 24.8 | 48.8 | 76.7 | 102.3 | 156.7 | 8.8 |
| Comparative Example 1 | 3.0 | 5.6 | 7.8 | 11.5 | 15.7 | 0.9 |
| Comparative Example 2 | 56.9 | * | * | * | * | — |

Note: *The film disappeard completely.

TABLE 6

Exposure Test (Antifouling Performance Test)

| | Proportion of area covered with marine organisms (%) | | | | |
|---|---|---|---|---|---|
| | 3 months | 6 months | 12 months | 18 months | 24 months |
| Example 1 | 0 | 0 | 0 | 0 | 0 |
| Example 2 | 0 | 0 | 0 | 0 | 0 |
| Example 3 | 0 | 0 | 0 | 0 | 0 |
| Example 4 | 0 | 0 | 0 | 0 | 0 |
| Example 5 | 0 | 0 | 0 | 0 | 0 |
| Example 6 | 0 | 0 | 0 | 0 | 0 |
| Example 7 | 0 | 0 | 0 | 0 | 0 |
| Example 8 | 0 | 0 | 0 | 0 | 0 |
| Example 9 | 0 | 0 | 0 | 0 | 0 |
| Example 10 | 0 | 0 | 0 | 0 | 0 |
| Example 11 | 0 | 0 | 0 | 0 | 0 |
| Example 12 | 0 | 0 | 0 | 0 | 0 |
| Example 13 | 0 | 0 | 0 | 0 | 0 |
| Example 14 | 0 | 0 | 0 | 0 | 0 |
| Example 15 | 0 | 0 | 0 | 0 | 0 |
| Example 16 | 0 | 0 | 0 | 0 | 0 |
| Example 17 | 0 | 0 | 0 | 0 | 0 |
| Example 18 | 0 | 0 | 0 | 0 | 0 |
| Example 19 | 0 | 0 | 0 | 0 | 0 |
| Example 20 | 0 | 0 | 0 | 0 | 0 |
| Example 21 | 0 | 0 | 0 | 0 | 0 |
| Example 22 | 0 | 0 | 0 | 0 | 0 |
| Example 23 | 0 | 0 | 0 | 0 | 0 |
| Example 24 | 0 | 0 | 0 | 0 | 0 |
| Example 25 | 0 | 0 | 0 | 0 | 0 |
| Example 26 | 0 | 0 | 0 | 0 | 0 |
| Example 27 | 0 | 0 | 0 | 0 | 0 |
| Example 28 | 0 | 0 | 0 | 0 | 0 |
| Example 29 | 0 | 0 | 0 | 0 | 0 |
| Example 30 | 0 | 0 | 0 | 0 | 0 |
| Example 31 | 0 | 0 | 0 | 0 | 0 |
| Comparative Example 1 | 20 | 40 | 100 | 100 | 100 |
| Comparative Example 2 | 0 | 10 | 50 | 100 | 100 |

TABLE 7

Adhesion Test

| | 3 months | 6 months | 9 months | 12 months | 18 months |
|---|---|---|---|---|---|
| Example 1 | ○ | ○ | ○ | ○ | ○ |
| Example 2 | ○ | ○ | ○ | ○ | ○ |
| Example 3 | ○ | ○ | ○ | ○ | ○ |
| Example 4 | ○ | ○ | ○ | ○ | ○ |
| Example 5 | ○ | ○ | ○ | ○ | ○ |
| Example 6 | ○ | ○ | ○ | ○ | ○ |
| Example 7 | ○ | ○ | ○ | ○ | ○ |
| Example 8 | ○ | ○ | ○ | ○ | ○ |
| Example 9 | ○ | ○ | ○ | ○ | ○ |
| Example 10 | ○ | ○ | ○ | ○ | ○ |
| Example 11 | ○ | ○ | ○ | ○ | ○ |
| Example 12 | ○ | ○ | ○ | ○ | ○ |
| Example 13 | ○ | ○ | ○ | ○ | ○ |
| Example 14 | ○ | ○ | ○ | ○ | ○ |
| Example 15 | ○ | ○ | ○ | ○ | ○ |
| Example 16 | ○ | ○ | ○ | ○ | ○ |
| Example 17 | ○ | ○ | ○ | ○ | ○ |
| Example 18 | ○ | ○ | ○ | ○ | ○ |
| Example 19 | ○ | ○ | ○ | ○ | ○ |
| Example 20 | ○ | ○ | ○ | ○ | ○ |
| Example 21 | ○ | ○ | ○ | ○ | ○ |
| Example 22 | ○ | ○ | ○ | ○ | ○ |
| Example 23 | ○ | ○ | ○ | ○ | ○ |
| Example 24 | ○ | ○ | ○ | ○ | ○ |
| Example 25 | ○ | ○ | ○ | ○ | ○ |
| Example 26 | ○ | ○ | ○ | ○ | ○ |
| Example 27 | ○ | ○ | ○ | ○ | ○ |
| Example 28 | ○ | ○ | ○ | ○ | ○ |
| Example 29 | ○ | ○ | ○ | ○ | ○ |
| Example 30 | ○ | ○ | ○ | ○ | ○ |
| Example 31 | ○ | ○ | ○ | ○ | ○ |
| Comparative Example 1 | × | × | × | × | × |
| Comparative Example 2 | × | × | × | × | × |

TABLE 8

| | Cracking Resistance Test | | | | |
|---|---|---|---|---|---|
| | 3 months | 6 months | 9 months | 12 months | 18 months |
| Example 1 | o | o | o | o | o |
| Example 2 | o | o | o | o | o |
| Example 3 | o | o | o | o | o |
| Example 4 | o | o | o | o | o |
| Example 5 | o | o | o | o | o |
| Example 6 | o | o | o | o | o |
| Example 7 | o | o | o | o | o |
| Example 8 | o | o | o | o | o |
| Example 9 | o | o | o | o | o |
| Example 10 | o | o | o | o | o |
| Example 11 | o | o | o | o | o |
| Example 12 | o | o | o | o | o |
| Example 13 | o | o | o | o | o |
| Example 14 | o | o | o | o | o |
| Example 15 | o | o | o | o | o |
| Example 16 | O | O | O | O | O |
| Example 17 | O | O | O | O | O |
| Example 18 | O | O | O | O | O |
| Example 19 | O | O | O | O | O |
| Example 20 | O | O | O | O | O |
| Example 21 | O | O | O | O | O |
| Example 22 | O | O | O | O | O |
| Example 23 | O | O | O | O | O |
| Example 24 | O | O | O | O | O |
| Example 25 | O | O | O | O | O |
| Example 26 | O | O | O | O | O |
| Example 27 | O | O | O | O | O |
| Example 28 | O | O | O | O | O |
| Example 29 | O | O | O | O | O |
| Example 30 | O | O | O | O | O |
| Example 31 | O | O | O | O | O |
| Comparative Example 1 | x | x | x | x | x |
| Comparative Example 2 | x (blistering, cracking) | x (peeling) | x (peeling) | x (peeling) | x (peeling) |

The results in Tables 5 to 8 indicate that the coating compositions according to the present invention described in Examples 1 to 31 provide coating films which have good film thickness reduction and exhibit excellent antifouling property such that no marine organisms attached to the films for up to 24 months. The coating films have good adhesive property and no defect. On the other hand, the coating composition in Comparative Example 1, which uses the polymer having a silyl ester group but having no hemiacetal ester group, provides a coating film which is defective in adhesive property and crack resistance. Also, the coating composition in Comparative Example 2, which uses the polymer having a hemiacetal ester group but having no silyl ester group, provides a coating film which is not suitable both in erosion rate and antifouling property. The coating film is also defective in adhesion and crack resistance, and, in particular, exhibits defects such as blisters, cracks and peeling with time.

While the invention has been described in detail and with reference to specific embodiments thereof, it will be apparent to one skilled in the art that various changes and modifications can be made therein without departing from the spirit and scope thereof.

What is claimed is:

1. A coating composition containing as essential components an antifoulant and a copolymer obtained from a monomer mixture comprising monomer A represented by formula (1):

wherein $R^1$ to $R^3$ which may be the same or different, each represents a linear, branched or cyclic alkyl group or an aryl group and X represents an acryloyloxy group, a methacryloyloxy group, a maleinoyloxy group, or a fumaroyloxy group, and monomer B represented by formula (2):

wherein $R^4$ represents a linear or branched alkyl group, $R_5$ represents a linear, branched or cyclic alkyl group, and Y represents an acryloyloxy group, a methacryloyloxy group, a maleinoyloxy group, or a fumaroyloxy group.

2. The coating composition as in claim 1, wherein said monomer mixture contains 1 to 95% by weight of monomer A and to 95% of weight of monomer B.

3. The coating composition as in claim 1, wherein said monomer mixture contains a vinyl monomer other than monomers A and B.

4. The coating composition as in claim 3, wherein said vinyl monomer is contained up to 98% by weight based on the total weight of the monomer mixture.

5. The coating composition as in claim 1, wherein said copolymer has a weight average molecular weight of from 1,000 to 150,000.

6. The coating composition as in claim 1, wherein said antifoulant is contained in an amount of from 0.1 to 90% by weight based on the solid contents of the coating composition.

* * * * *